US009026344B2

(12) United States Patent
Yamamoto et al.

(10) Patent No.: US 9,026,344 B2
(45) Date of Patent: May 5, 2015

(54) IN-VEHICLE INTERNAL COMBUSTION ENGINE CONTROL DEVICE, AND CONTROL METHOD FOR INTERNAL COMBUSTION ENGINE

(75) Inventors: Masaya Yamamoto, Kasugai (JP); Masashi Funada, Obu (JP)

(73) Assignees: Toyota Jidosha Kabushiki Kaisha, Aichi-ken (JP); Denso Corporation, Aichi-ken (JP)

( * ) Notice: Subject to any disclaimer, the term of this patent is extended or adjusted under 35 U.S.C. 154(b) by 96 days.

(21) Appl. No.: 13/581,721

(22) PCT Filed: Jul. 11, 2011

(86) PCT No.: PCT/IB2011/001604
§ 371 (c)(1),
(2), (4) Date: Aug. 29, 2012

(87) PCT Pub. No.: WO2012/007813
PCT Pub. Date: Jan. 19, 2012

(65) Prior Publication Data
US 2013/0110379 A1    May 2, 2013

(30) Foreign Application Priority Data

Jul. 12, 2010  (JP) ................. 2010-158212

(51) Int. Cl.
*F02D 41/32* (2006.01)
*B60K 6/448* (2007.10)
(Continued)

(52) U.S. Cl.
CPC .............. *F02D 41/32* (2013.01); *B60K 6/448* (2013.01); *B60W 10/06* (2013.01); *B60W 20/00* (2013.01);
(Continued)

(58) Field of Classification Search
CPC ......... B60K 6/485; B60K 6/24; B60W 10/06; B60W 20/00; B60W 2510/107; B60W 10/08; B60W 20/40; F16F 13/26; F02D 41/062

USPC ................. 701/104, 102, 113, 22; 123/179.3, 123/179.4, 179.16, 491; 290/38 C, 38 R; 381/71.14, 71.2; 180/65.285, 300, 385; 267/140.13

See application file for complete search history.

(56) References Cited

U.S. PATENT DOCUMENTS 6,808,168 B2 * 10/2004 Muramatsu et al. ..... 267/140.13
6,931,318 B2 *  8/2005 Kaita et al. .................... 701/113
(Continued)

FOREIGN PATENT DOCUMENTS

JP    2000-064874 A    2/2000
JP    2004-218555 A    8/2004
(Continued)

OTHER PUBLICATIONS

International Search Report and Written Opinion for corresponding International Patent Application No. PCT/IB2011/001604 mailed Dec. 7, 2011.

*Primary Examiner* — Lindsay Low
*Assistant Examiner* — Susan E Scharpf
(74) *Attorney, Agent, or Firm* — Sughrue Mion, PLLC

(57) ABSTRACT

At the time of an engine start while the vehicle is driving, when a required vehicle driving force (TRQ) is smaller than or equal to a predetermined value (TRQth), an electronic control unit (20) estimates that the degree of deformation of a mount (11) is smaller than or equal to a predetermined degree and sets a second-cycle fuel injection amount (Q2) so as to be larger than a first-cycle fuel injection amount (Q1) at the time of the engine start. On the other hand, when the required vehicle driving force (TRQ) is larger than the predetermined value (TRQth), the electronic control unit (20) estimates that the degree of deformation of the mount (11) is larger than the predetermined degree and sets the first-cycle fuel injection amount (Q1) so as to be larger than the second-cycle fuel injection amount (Q2) at the time of the engine start.

6 Claims, 8 Drawing Sheets

(51) Int. Cl.
| | | |
|---|---|---|
| *B60W 10/06* | (2006.01) | |
| *B60W 20/00* | (2006.01) | |
| *B60W 30/192* | (2012.01) | |
| *B60W 30/20* | (2006.01) | |
| *F02D 41/02* | (2006.01) | |
| *F02D 41/06* | (2006.01) | |
| *F02D 41/14* | (2006.01) | |
| *B60K 6/445* | (2007.10) | |

(52) U.S. Cl.
CPC ............. *B60W 30/192* (2013.01); *B60W 30/20* (2013.01); *B60W 2540/10* (2013.01); *B60W 2710/0627* (2013.01); *B60W 2710/0672* (2013.01); *F02D 41/0215* (2013.01); *F02D 41/061* (2013.01); *F02D 41/064* (2013.01); *F02D 41/065* (2013.01); *F02D 41/1498* (2013.01); *F02D 2250/28* (2013.01); *Y02T 10/6243* (2013.01); *Y02T 10/6269* (2013.01); *B60K 6/445* (2013.01); *Y02T 10/6239* (2013.01)

(56) References Cited

U.S. PATENT DOCUMENTS

| | | | |
|---|---|---|---|
| 7,082,930 B2* | 8/2006 | Liller et al. | 123/491 |
| 7,357,204 B2* | 4/2008 | Hisada et al. | 180/65.285 |
| 2012/0209463 A1* | 8/2012 | Gibbs et al. | 701/22 |

FOREIGN PATENT DOCUMENTS

| | | |
|---|---|---|
| JP | 2007-198295 A | 8/2007 |
| JP | 2009-281260 A | 12/2009 |

* cited by examiner

— TRANSMISSION OF POWER
---→ ALTERNATING CURRENT
----- DIRECT CURRENT

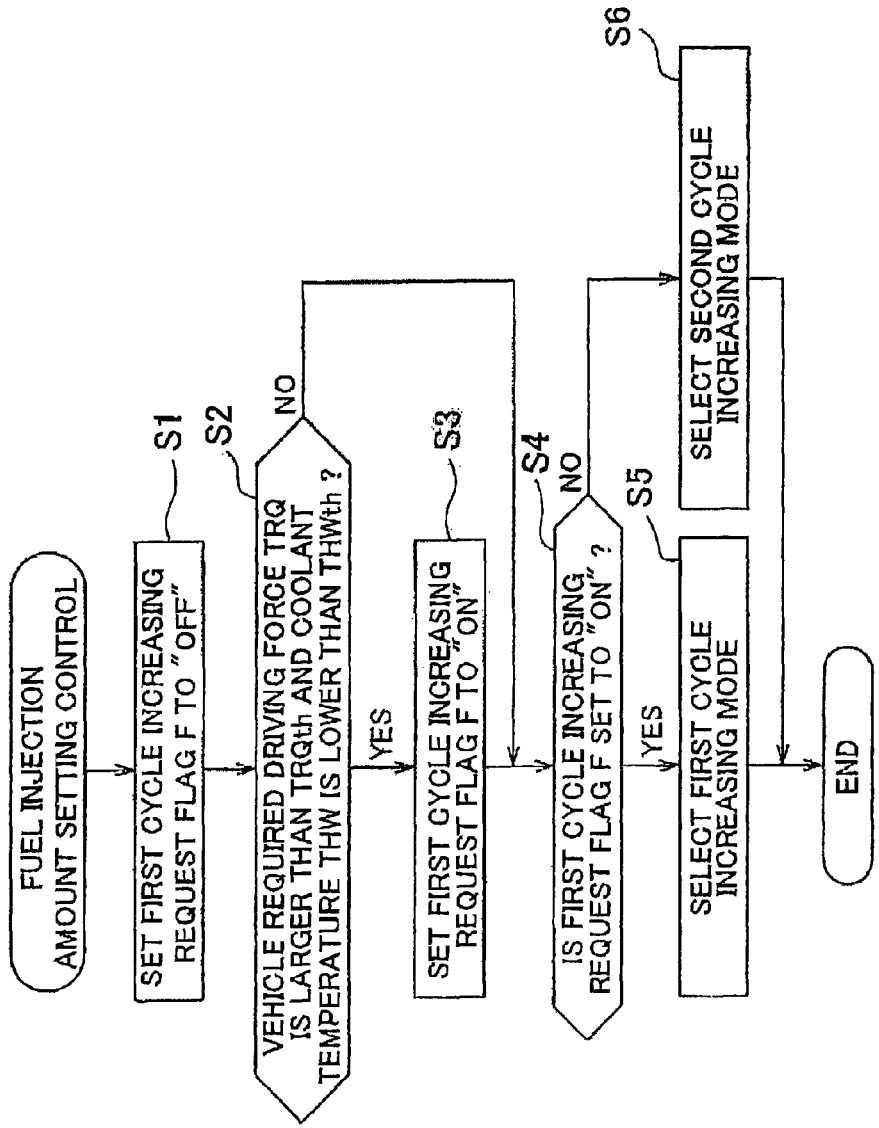

IN-VEHICLE INTERNAL COMBUSTION ENGINE CONTROL DEVICE, AND CONTROL METHOD FOR INTERNAL COMBUSTION ENGINE

BACKGROUND OF THE INVENTION

1. Field of the Invention

The invention relates to an in-vehicle internal combustion engine control device and a control method for am internal combustion engine, which are applied to a vehicle equipped with an internal combustion engine and another power source, other than the internal combustion engine, as devices that transmit power to a drive wheel, and which start the engine while the vehicle is driving.

2. Description of Related Art

An in-vehicle internal combustion engine control device of this type is for example, described in Japanese Patent Application Publication No. 2009-281260 (JP-A-2009-281260). General in-vehicle internal combustion engine control devices, including the one described in JP-A-2009-281260, control a vehicle equipped with both an internal combustion engine and an electric motor as power sources for rotating the drive wheels of the vehicle, that is, a so-called hybrid vehicle (hereinafter, simply referred to as "HV"). In such control devices, when the vehicle starts driving or when the vehicle is driving at a low speed, the internal combustion engine is stopped, and the vehicle drives only on power from the electric power (electric vehicle drive mode; hereinafter, simply referred to as "EV drive mode"). In addition, when the vehicle is accelerating or when the vehicle is driving at a high speed, the internal combustion engine is operated, and the vehicle drives on power from the internal combustion engine in addition to or instead of power from the electric motor (hereinafter, simply referred to as "non-EV drive mode"). Specifically, as shown by the solid line in FIG. 8, an EV drive mode range and a non-EV drive mode range are defined by a vehicle speed V and a required driving force TRQ of the vehicle, and, as the vehicle driving state shifts from the EV drive mode range to the non-EV drive mode range with a change in the vehicle speed V or a change in the required driving force TRQ of the vehicle, the engine is started.

Incidentally, in fuel injection control of a typical internal combustion engine, in order to improve startability, the first-cycle fuel injection amount is set so as to be larger than the second and the following-cycle fuel injection amounts at the time of an engine start. However, when the control device of the above described HV starts the engine while the vehicle is driving, if the first-cycle fuel injection amount is set so as to be larger than the second and the following-cycle fuel injection amounts, the power of the engine steeply varies with combustion of fuel injected in the first cycle to increase the magnitude of vibrations transmitted to the vehicle body. This makes a driver experience a significant uncomfortable feeling.

Then, in the control device of a typical HV, the second-cycle fuel injection amount is set so as to be larger than the first-cycle fuel injection amount at the time of an engine start while the vehicle is driving to suppress a steep variation in the power of the engine. This suppresses an increase in the magnitude of vibrations transmitted to the vehicle body to alleviate driver's uncomfortable feeling.

In addition, in recent years, development of a vehicle that charges a battery with, not only electric power generated by driving a generator with the power of an engine but also electric power supplied from a power supply outside the vehicle, such as a domestic power supply, that is, a so-called plug-in hybrid vehicle (hereinafter, simply referred to as "PHV"), has been proceeding. In the PHV, the charging capacity of the battery is larger than that of a typical HV, so the EV drive mode range is expanded as shown by the alternate long and short dashes line in FIG. 8.

Incidentally, particularly, in the control device of such a PHV, the EV drive mode-range is expanded as compared with the control device of a typical HV, so, as shown, for example, in FIG. 8, when the vehicle speed V is the same, the EV drive mode may be maintained to a further larger required driving force of the vehicle. Therefore, as the vehicle driving state shifts from the EV drive mode range to the non-EV drive mode range, the vehicle driving force at that time increases, and a mount that couples the internal combustion engine to the vehicle body elastically deforms by a large amount because of the reaction force of the driving force. Then, when the engine is started in a state where the mount is elastically deformed by a large amount, that is, in a state where a margin for the mount to suppress transmission of vibrations is small, if the second-cycle fuel injection amount is set so as to be larger than the first-cycle fuel injection amount at the time of the engine start as described above, vibrations due to initial combustion, transmitted to the vehicle body, is not favorably reduced through elastic deformation of the mount. Thus, as the time interval between vibrations due to cranking and vibrations due to combustion of fuel injected in the second cycle extends, driver's uncomfortable feeling may become more significant.

Note that such a phenomenon is not limited to the control device of a PHV but it can occur almost in common to the control device of an HV in which the EV drive mode range is expanded.

SUMMARY OF THE INVENTION

The invention provides an in-vehicle internal combustion engine control device and a control method for an internal combustion engine, which are able to alleviate driver's uncomfortable feeling caused by an engine start while the vehicle is driving.

A first aspect of the invention relates to an in-vehicle internal combustion engine control device. The in-vehicle internal combustion engine control device is applied to a vehicle equipped with an internal combustion engine and a power source, other than the internal combustion engine, as power sources that rotate a drive wheel, and that starts the engine while the vehicle is driving. The in-vehicle internal combustion engine control device includes: detecting means that detects a parameter associated with a degree of deformation of a mount that couples the internal combustion engine to a body of the vehicle and that reduces transmission of vibrations of the engine to the body of the vehicle through elastic deformation of the mount; and a setting unit that, at the time of an engine start while the vehicle is driving, when it is estimated from the parameter detected, by the detecting means that the degree of deformation of the mount is large, sets a first-cycle fuel injection amount so as to be larger than a second-cycle fuel injection amount at the time of the engine start as compared with when it is estimated that the degree of deformation of the mount is small.

With the above configuration, at the time of an engine start while the vehicle is driving, when it is estimated from the detected parameter that the degree of deformation of the mount small, the first-cycle fuel injection amount is set so as to be smaller than the second-cycle fuel injection amount at the time of the engine start. By so doing, an increase in engine power output due to initial combustion is gentle. In addition, at this time, because the degree of deformation of the mount is small, that is, a margin for the mount to elastically deform is large, transmission of vibrations due to initial combustion to the vehicle body is favorably reduced through elastic deformation of the mount. On the other hand, at the time of an engine start while the vehicle is driving, when it is estimated from the detected parameter that the degree of deformation of the mount is large, the first-cycle fuel injection amount is set so as to be larger than the second-cycle fuel injection amount. By so doing, when the degree of deformation of the mount is large, that is, a margin for the mount to elastically deform is small, and, therefore, transmission of vibrations due to initial combustion to the vehicle body cannot favorably be reduced through elastic deformation of the mount, vibrations due to initial combustion are caused to occur at a further early timing to thereby make it possible to reduce the time interval between vibrations due to cranking and vibrations due to initial combustion. Thus, driver's uncomfortable feeling caused by an engine start while the vehicle is driving may be reduced. Note that an electric motor may be, for example, employed as another motor.

In the in-vehicle internal combustion engine control device according to the above aspect, when it is estimated that the degree of deformation of the mount is smaller than or equal to a predetermined degree, the setting unit may set the second-cycle fuel injection amount so as to be larger than the first-cycle fuel injection amount at the time of the engine start; whereas, when it is estimated that the degree of deformation of the mount is larger than the predetermined degree, the setting unit may set the first-cycle fuel injection amount so as to be larger than the second-cycle fuel injection amount at the time of the engine start. In this case, when it is estimated that the degree of deformation of the mount is smaller than or equal to the predetermined degree, an increase in engine power output due to initial combustion may become appropriately gentle. In addition, when it is estimated that the degree of deformation of the mount is larger than the predetermined degree, vibrations due to initial combustion may be appropriately caused to occur at a further early timing, and the time interval between vibrations due to cranking and vibrations due to initial combustion may be appropriately reduced. Thus, driver's uncomfortable feeling caused by an engine start while the vehicle is driving may be appropriately reduced.

In the in-vehicle internal combustion engine control device according to the above aspect, the detecting means may detect a driving state of the vehicle as the parameter.

For example, as the acceleration of the vehicle increases while the vehicle is driving, the acceleration of the internal combustion engine mounted on the vehicle increases, and a force that acts on the internal combustion engine increases accordingly. Then, with an increase in force that acts on the internal combustion engine, the degree of deformation of the mount increases. Thus, as in the case of the above configuration, when the driving state of the vehicle is detected as the parameter associated with the degree of deformation of the mount, the degree of deformation of the mount may be appropriately acquired through the detected driving state of the vehicle. Note that, other than the required driving force of the vehicle or the acceleration of the vehicle, the driving force of the vehicle, the accelerator operation amount, or the like, may be employed as the driving state of the vehicle.

In the in-vehicle internal combustion engine control device according to the above aspect, the detecting means, may detect a required driving force of the vehicle as the parameter, and when the required driving force of the vehicle is smaller than or equal to a predetermined value, the setting unit may estimate that the degree of deformation of the mount is smaller than or equal to a predetermined degree to set the second-cycle fuel injection amount so as to be larger than the first-cycle fuel injection amount at the time of the engine start; whereas, when the required driving force of the vehicle is larger than the predetermined value, the setting unit may estimate that the degree of deformation of the mount is larger than the predetermined degree to set the first-cycle fuel injection amount so as to be larger than the second-cycle fuel injection amount at the time of the engine start.

In the in-vehicle internal combustion engine control device according to the above aspect, when a temperature of the engine is lower than a predetermined temperature, the setting unit may set a fuel injection amount on the basis of the degree of deformation of the mount, which is estimated from the parameter.

The startability of the engine deteriorates when the temperature of the engine is low, so, generally, the fuel injection amount is increased in order to suppress deterioration of the startability. Therefore, when the temperature of the engine is low, variations in engine power output due to initial combustion because of an increase in the fuel injection amount, so vibrations due to initial combustion increase. Therefore, specifically, when the degree of deformation of the mount is large at the time of a cold start while the vehicle is driving, there is a high possibility that transmission of vibrations due to initial combustion to the vehicle body cannot favorably be reduced through elastic deformation of the mount.

In terms of this point, with the above configuration, when the temperature of the engine is lower than the predetermined temperature, the fuel injection amount is set on the basis of the degree of deformation of the mount, which is estimated from the parameter. By so doing, it is possible to appropriately determine the state where transmission of vibrations due to initial combustion to the vehicle body cannot favorably be reduced through elastic deformation of the mount, so it is possible to appropriately reduce driver's uncomfortable feeling caused by an engine start while the vehicle is driving.

In the in-vehicle internal combustion engine control device according to the above aspect, when the temperature of the engine is lower than the predetermined temperature, the setting unit may increase the sum total of the first-cycle fuel injection amount and the second-cycle fuel injection amount at the time of the engine start as compared with when the temperature of the engine is higher than or equal to the predetermined temperature.

A second aspect of the invention relates to a control method for an internal combustion engine of a vehicle equipped with the internal combustion engine and a power source, other than the internal combustion engine, as power sources that rotate a drive wheel, the control method starting the engine while the vehicle is driving. The control method includes: detecting a parameter associated with a degree of deformation of a mount that couples the internal combustion engine to a body of the vehicle and that reduces transmission of vibrations of the engine to the body of the vehicle through elastic deformation of the mount; and, at the time of an engine start while the vehicle is driving, when it is estimated from the detected parameter that the degree of deformation of the mount is large, setting a first-cycle fuel injection amount so as to be larger than a second-cycle fuel injection amount at the time of the engine start as compared with when it is estimated that the degree of deformation of the mount is small.

With the control method for an internal combustion engine according to the above aspect, the same advantageous effect as that of the in-vehicle internal combustion engine control device according to the first aspect may be obtained.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5 is a flowchart that shows the procedure of fuel injection amount setting control at the time of an engine start while the vehicle is driving according to the embodiment;

DETAILED DESCRIPTION OF EMBODIMENTS

Hereinafter, a specific embodiment in which an in-vehicle internal combustion engine control device according to the aspect of the invention is applied to a control device of a hybrid vehicle (hereinafter, referred to as vehicle) 1 will be described in detail with reference to FIG. 1 to FIG. 7.

Figure 1:
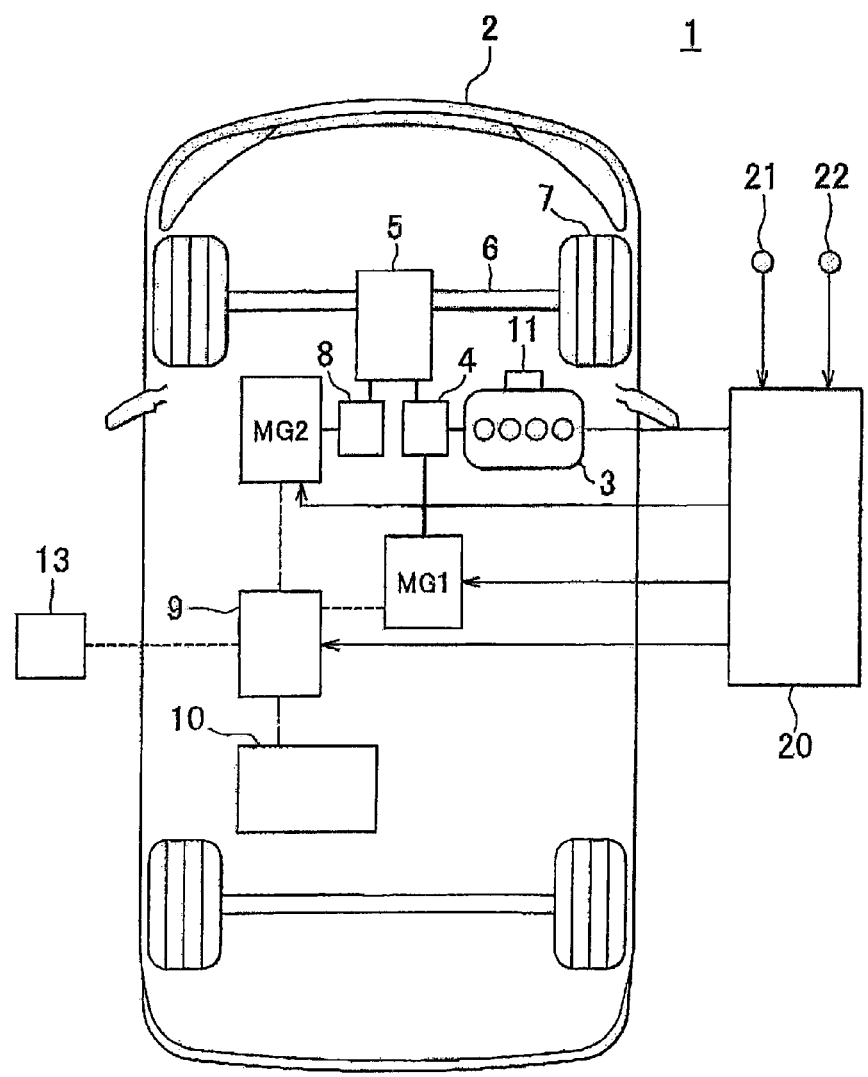
FIG. 1 is a schematic view that shows the schematic configuration of a vehicle that is equipped with an in-vehicle internal combustion engine control device according to an embodiment of the invention.
Figure 2:
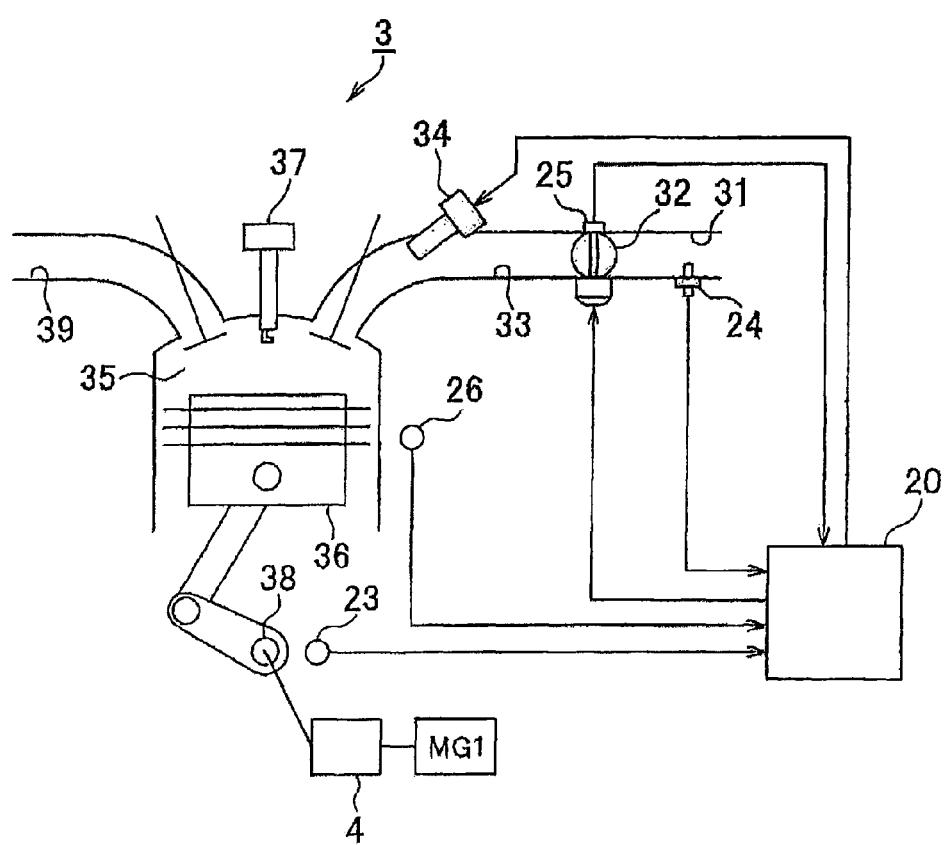
FIG. 2 is a cross-sectional view that schematically shows the cross-sectional structure of an internal combustion engine according to the embodiment.

FIG. 1 shows the schematic configuration of the vehicle according to the present embodiment. FIG. 2 schematically shows the cross-sectional structure of an internal combustion engine according to the present, embodiment. Note that FIG. 2 shows the cross-sectional structure of one of cylinders.

As shown in FIG. 1, the vehicle includes the internal combustion engine 3 and a motor generator (hereinafter, referred to as second motor generator) MG2 as power sources that rotate drive wheels 7. Specifically, the vehicle 1 according to the present embodiment is a so-called plug-in hybrid vehicle (hereinafter, referred to as PHV) of which a battery 10 is chargeable from an external power supply 13, such as a domestic power supply. Power output from the internal combustion engine 3 is transmitted to the drive wheels 7, via a power split mechanism 4, a reduction gear 5 and axles 6. In addition, power output from the second motor generator MG2 is transmitted to the drive wheels 7 via a motor reduction mechanism 8, the reduction gear 5 and the axle 6. Note that the vehicle 1 according to the present embodiment is configured so that the front wheels are the drive wheels 7 and the rear wheels are driven wheels.

The internal combustion engine 3 according to the present embodiment is an in-line four-cylinder port-fuel-injection engine. As shown in FIG. 2, a throttle valve 32 is provided in an intake passage 31, and fuel injection valves 34 are respectively provided for intake ports 33. The throttle valve 32 is used to regulate the amount of intake air. The intake ports 33 are provided cylinder by cylinder in the intake passage 31. The fuel injection valves 34 inject and supply fuel to these intake ports 33. A mixture of fuel supplied from each fuel injection valve 34 and intake air is compressed by a piston 36 in a combustion chamber 35, and is then ignited by an ignition plug 37 to combust. Then, a crankshaft 38, which is an engine output shaft, is driven for rotation by expansion energy generated by combustion of the air-fuel mixture. Note that exhaust air after combustion is exhausted outside via an exhaust passage 39.

As shown in FIG. 1, power output from the internal combustion engine 3 is split by the power split mechanism 4 into power transmitted to the drive wheels 7 and power transmitted to a motor generator (hereinafter, referred to as a first motor generator) MG1. The first motor generator MG1 generates electric power using power output from the internal combustion engine 3. The generated electric power is supplied to a battery 10 via an electric power converting unit 9 to thereby charge the battery 10. Incidentally, in the present embodiment, a lithium ion secondary battery is employed as the battery 10.

Note that, when the internal combustion engine 3 is started, the first motor generator MG1 uses electric power supplied from the battery 10 to be driven for cranking. That is, the first motor generator MG1 functions as a starter for the internal, combustion engine 3.

On the other hand, the second motor generator MG2 uses electric power supplied from the battery 10 to output power. In addition, the motor generator MG2 generates electric power using the rotational force of the drive wheels 7 during deceleration, braking, or the like, of the vehicle 1, and the generated electric power is supplied to the battery 10 via the electric power converting unit 9 to charge the battery 10.

In addition, the battery 10 is also configured to be charged with electric power supplied from the external power supply 13 via a charging cable (not shown) and the electric power converting unit 9. Here, the electric power converting unit 9 includes an inverter, a converter, and the like. The electric power converting unit 9 converts alternating-current electric power, supplied from the motor generators MG1 and MG2, to direct-current electric power, converts the voltage of the direct-current electric power to the voltage level of the battery 10, and then supplies the converted electric power to the battery 10. In addition, the electric power converting unit 9 converts direct-current electric power, supplied from the battery 10, to alternating-current electric power, steps up the voltage of the alternating-current electric power, and then supplies the converted electric power to the motor generators MG1 and MG2.

In addition, a mount 11 is provided for a vehicle body 2. The mount 11 couples the internal combustion engine 3 to the vehicle body 2. The mount 11 is formed of an elastic member. The mount 11 elastically deforms to reduce transmission of engine vibrations to the vehicle body 2. Incidentally, in the present embodiment, a known liquid filled mount is employed as the mount 11.

Vehicle control, including control over the internal combustion engine 3 and control over the motor generators MG1 and MG2, is executed by an electronic control unit 20. The electronic control unit 20 includes a central processing unit (CPU), a nonvolatile memory (ROM) and a volatile memory (RAM). The CPU executes numerical calculation, logical operation, and the like, in accordance with programs. The ROM stores programs and data required for various controls. The RAM temporarily stores input data and processing results.

In addition, the electronic control unit 20 is provided with various sensors for acquiring the vehicle driving state and the operating state of the internal combustion engine 3. Such sensors include an accelerator operation amount sensor 21 and a vehicle speed sensor 22. The accelerator operation amount sensor 21 detects the depression amount (hereinafter, accelerator operation amount) ACCP of an accelerator pedal of the vehicle 1. The vehicle speed sensor 22 detects the vehicle speed V. In addition, such sensors include an engine rotational speed sensor 23, an intake air amount sensor 24, a throttle opening degree sensor 25 and a coolant temperature sensor 26. The engine rotational speed sensor 23 detects the engine rotational speed NE that is the rotational, speed of the crankshaft 38. The intake air amount sensor 24 detects the amount of intake air. The throttle opening degree sensor 25 detects the opening degree (hereinafter, throttle opening degree) TA of the throttle valve 32. The coolant temperature sensor 26 detects the temperature (hereinafter, coolant temperature) THW of coolant of the internal combustion engine 3. In addition; such sensors include a sensor (not shown) that detects the quantity of state (battery voltage, battery current, battery temperature) of the battery 10.

The electronic control unit 20 calculates a required driving force TRQ of the vehicle on the basis, of the accelerator operation amount ACCP, and the like, and executes vehicle drive control on the basis of the required driving force TRQ and the vehicle speed V. When the vehicle 1 starts driving or is driving at a low speedy the internal combustion engine 3 is stopped, the vehicle drives only on power output from the second motor generator MG2 (electric vehicle drive mode; hereinafter, referred to as "EV drive mode"). In addition, when the vehicle is accelerating or is driving at a high speed, the internal combustion engine 3 is operated, and the vehicle drives on power output from the internal combustion engine 3 in addition to or instead of power output from the second motor generator MG2 (hereinafter, "non-EV drive mode").

Figure 3:
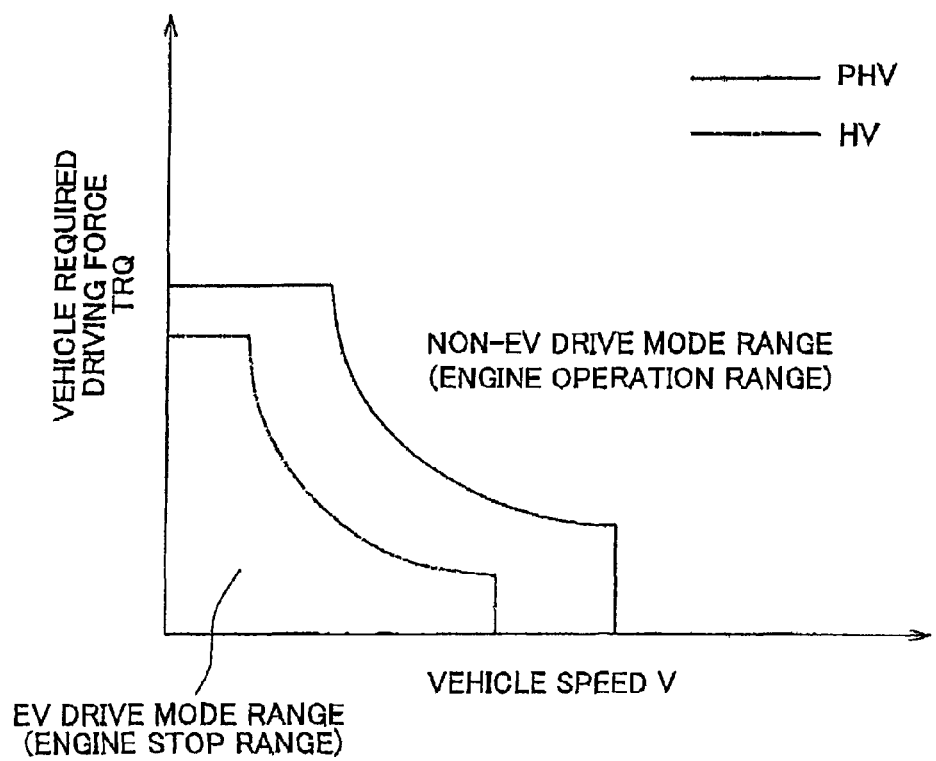
FIG. 3 is a map that defines an EV drive mode range and a non-EV drive mode range by a vehicle speed and a required driving force according to the embodiment.

FIG. 3 is a map that defines an EV drive mode range and a non-EV drive mode range by the vehicle speed V and the required driving force TRQ. Note that, in FIG. 3, the map for PHV is indicated by the solid line, and the map for a typical hybrid vehicle (hereinafter, referred to as HV) is indicated by the alternate long and short dashes line.

As indicated by the solid line in FIG. 3, in the EV drive mode range, the vehicle speed V is low or the required driving force TRQ is small. In addition, in the non-EV drive mode range, the vehicle speed V is high or the required driving force TRQ is large. Therefore, as the vehicle driving state shifts from the EV drive mode range to the non-EV drive mode range with an increase in the vehicle speed V or an increase in the required driving force TRQ of the vehicle, the internal combustion engine 3 is started. In addition, in the PHV according to the present embodiment, the charging capacity of the battery is larger than that of the typical HV, so the EV drive mode range is expanded for both the vehicle speed V and the required driving force TRQ of the vehicle as compared with the EV drive mode range of the HV, indicated by the alternate long and short dashes line in FIG. 3.

Here, the mass of the rotor of an electric motor that cranks the internal combustion engine 3, that is, the first motor generator MG1, in the PHV according to the present embodiment is by far larger than that of an electric motor that cranks the internal combustion engine only, that is, a so-called starter motor, in a vehicle. Then, because the rotor having a large mass is coupled to the crankshaft 38 in this way, torsional resonance of these rotor and crankshaft 38 easily occurs. In addition, such torsional resonance occurs when the engine rotational speed NE falls within a predetermined resonance range (for example, 400 rpm≤NE≤500 rpm). Then, when the internal combustion engine 3 is started, the internal combustion engine 3 is cranked until the engine rotational speed NE reaches a cranking rotational speed Ncrnk (for example, 1000 rpm) that is higher than the upper limit value of the resonance range (in this case, 500 rpm), torque control over the first motor generator MG1 is executed so that the engine rotational speed. NE quickly passes through the resonance range. By so doing, vibrations transmitted to the vehicle based on the above described torsional resonance is reduced.

Incidentally, as described above, in typical fuel injection control over the internal combustion engine 3, in order to improve startability, at the time of an engine start, the first-cycle fuel injection amount Q1 is set so as to be larger than the second-cycle fuel injection amount Q2 and the following-cycle fuel injection amounts (Q1>Q2, Q3, . . . ). Here, first-cycle fuel injection is the first fuel injection of the first to fourth cylinders, and second-cycle fuel injection is the second fuel injection of the first to fourth cylinders. However, when the engine is started while the vehicle is driving, if the first-cycle fuel injection amount Q1 is set so as to be larger than the second-cycle fuel injection amount Q2, engine power output steeply varies with combustion of fuel injected in the first cycle to increase the magnitude of vibrations transmitted to the vehicle body 2. This makes a driver experience a significant uncomfortable feeling.

Then, as described above, in the control device of the typical HV, at the time of an engine start while the vehicle is driving, the second-cycle fuel injection amount Q2 is set so as to be larger than the first-cycle fuel injection amount Q1 (Q2 Q1) to suppress a steep variation in engine power output to thereby suppress an increase in the magnitude of vibrations transmitted to the vehicle body 2, thus alleviating drive's uncomfortable feeling.

Figure 4:
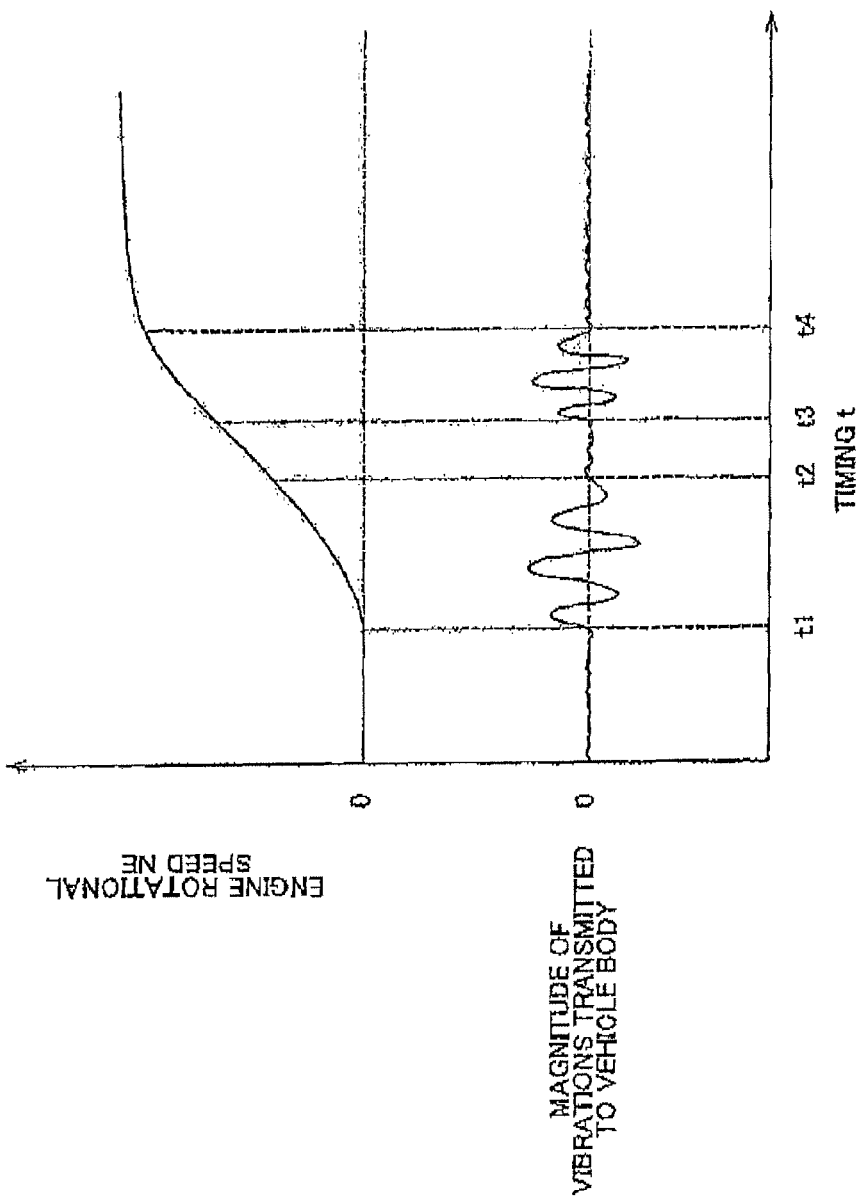
FIG. 4 is a timing, chart that shows a change in engine rotational, speed and a change in the magnitude of vibrations transmitted to a vehicle body when the second-cycle fuel injection amount is set so as to be larger than the first-cycle fuel injection amount at the time of an engine start in a state where a mount is elastically deformed by a large amount while the vehicle is driving according to a related art.

Incidentally, in the electronic control unit 20 according to the present embodiment, that is, the control device of the PHV, the EV drive mode range is expanded as compared with the control device of the typical HV, so, for example, as shown in FIG. 3, when the vehicle speed V is the same, the EV drive mode is executed until a larger required driving force TRQ of the vehicle. Therefore, as the vehicle driving state shifts from the EV drive mode range to the non-EV drive mode range, the driving force of the vehicle at that time increases, and the mount 11 that couples the internal combustion engine 3 to the vehicle body 2 elastically deforms by a large amount because of the reaction force of the driving force. Then, when the engine is started in a state where the mount 11 is elastically deformed by a large amount, that is, in a state where a margin for the mount 11 to suppress transmission of vibrations is small, if the second-cycle fuel injection amount Q2 is set so as to be larger than the first-cycle fuel injection amount Q1 (Q2>Q1) at the time of the engine start as described above, transmission of vibrations due to initial combustion to the vehicle body 2 is not favorably reduced through elastic deformation, of the mount 11. Thus, as shown in FIG. 4, as the time interval between vibrations due to cranking (timing t1 to t2) and vibrations due to combustion of fuel injected in the second cycle (timing t3 to t4) extends, driver's uncomfortable feeling may become more significant.

Then, in the present embodiment, by executing fuel injection amount setting control at the time of an engine start while the vehicle is driving, which will be described below, driver's uncomfortable feeling caused by an engine start while the vehicle is driving is reduced.

Next, the procedure of the fuel injection amount setting control at the time of an engine start while the vehicle is driving according to the present embodiment will be described with reference to the flowchart of FIG. 5. Note that a series of processes shown in the flowchart are executed just once at the time when the engine start condition while the vehicle is driving is satisfied.

As shown in FIG. 5, in the series of processes, initially, a first cycle increasing request flag F is set to "OFF" in the process of step S1. Then, subsequently, in step S2, it is determined whether the required driving force TRQ of the vehicle at that time is larger than a predetermined value TRQth and the coolant temperature THW at that time is lower than a predetermined temperature THWth.

Here, when the required driving force TRQ of the vehicle is larger than the predetermined value TRQth and the coolant temperature THW is lower than the predetermined temperature THWth for determining whether the internal combustion engine 3 is cold-started ("YES" in step S2), it is determined that the degree of deformation of the mount 11 at that time is larger than a predetermined degree that is an upper limit value at or below which vibrations due to combustion of fuel injected in the second cycle may be favorably reduced through further elastic deformation of the mount 11, and then the process proceeds to step S3. Then, in step S3, the first cycle increasing request flag F is set to "ON", and then the process proceeds to step S4.

On the other hand, in step S2, when the required driving force TRQ of the vehicle is smaller than or equal to the predetermined value TRQth or when the coolant temperature THW is higher than or equal to the predetermined temperature THWth ("NO" in step S2), it is determined that the degree of deformation of the mount 11 at that time is smaller than or equal to the predetermined degree that is the upper limit value at or below which vibrations due to combustion of fuel injected in the second cycle may be favorably reduced through further elastic deformation of the mount 11, and then the process skips step S3 and proceeds to step S4. That is, the predetermined value TRQth is the required driving force TRQ of the vehicle at which the degree of, deformation of the mount 11 is the predetermined degree when the coolant temperature THW is the predetermined temperature THWth.

Figure 6A:
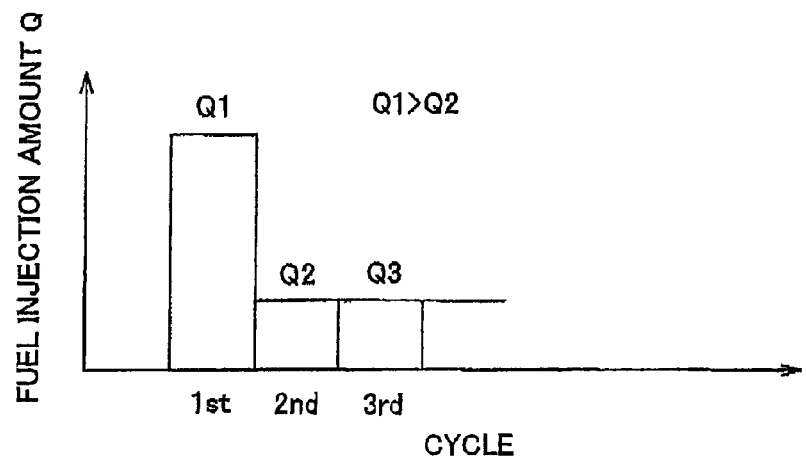
FIG. 6A is a graph for illustrating a first-cycle increasing mode according to the embodiment.

In step S4, it is determined whether the first cycle increasing request flag F is "ON". Then, when the first cycle increasing request flag F is "ON" ("YES" in step S4), the process proceeds to step S5, and then a first-cycle increasing mode is selected, after which the series of processes ends. Here, as the first-cycle increasing mode is selected, the first-cycle fuel injection amount Q1 is set so as to be larger than the second-cycle fuel injection amount Q2 at the time of the engine start (Q1 Q2), as shown in FIG. 6A.

Figure 6B:
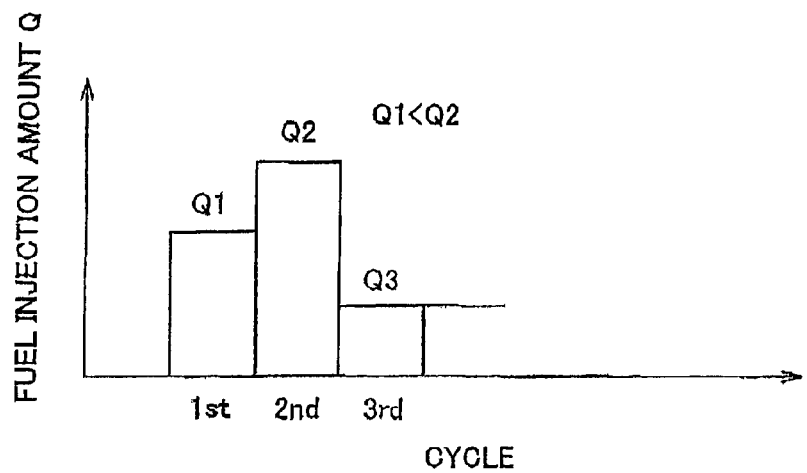
FIG. 6B is a graph for illustrating a second-cycle increasing mode according to the embodiment.

On the other hand, in step S4, when the first cycle increasing request flag F is "OFF" ("NO" in step S4), the process proceeds to step S6, and then a second-cycle increasing mode is selected, after which the series of processes ends. Here, as the second-cycle increasing mode is selected, the second-cycle fuel injection amount Q2 is set so as to be larger than the first-cycle fuel injection amount Q1 at the time of the engine start (Q2>Q1), as shown in FIG. 6B.

Incidentally, the sum total Qtotal (=Q1+Q2) of the first-cycle fuel injection amount Q1 and the second-cycle fuel injection amount Q2 is set on the basis of the coolant temperature THW, and the startability of the internal combustion engine 3 deteriorates when the coolant temperature THW is low, so the sum total Qtotal is increased when the coolant temperature THW is low than when the coolant temperature THW is high in order to suppress such deterioration of the startability.

Next, the operation of the present embodiment will be described with reference to the timing chart shown in FIG. 7. Note that FIG. 7 is a timing chart that shows a change in engine rotational speed and a change in the magnitude of vibrations transmitted to the vehicle body when the first-cycle fuel injection amount is set so as to be larger than the second-cycle fuel injection amount at the time of an engine start in a state where the mount 11 is elastically deformed by a large amount while the vehicle is driving.

Figure 7:
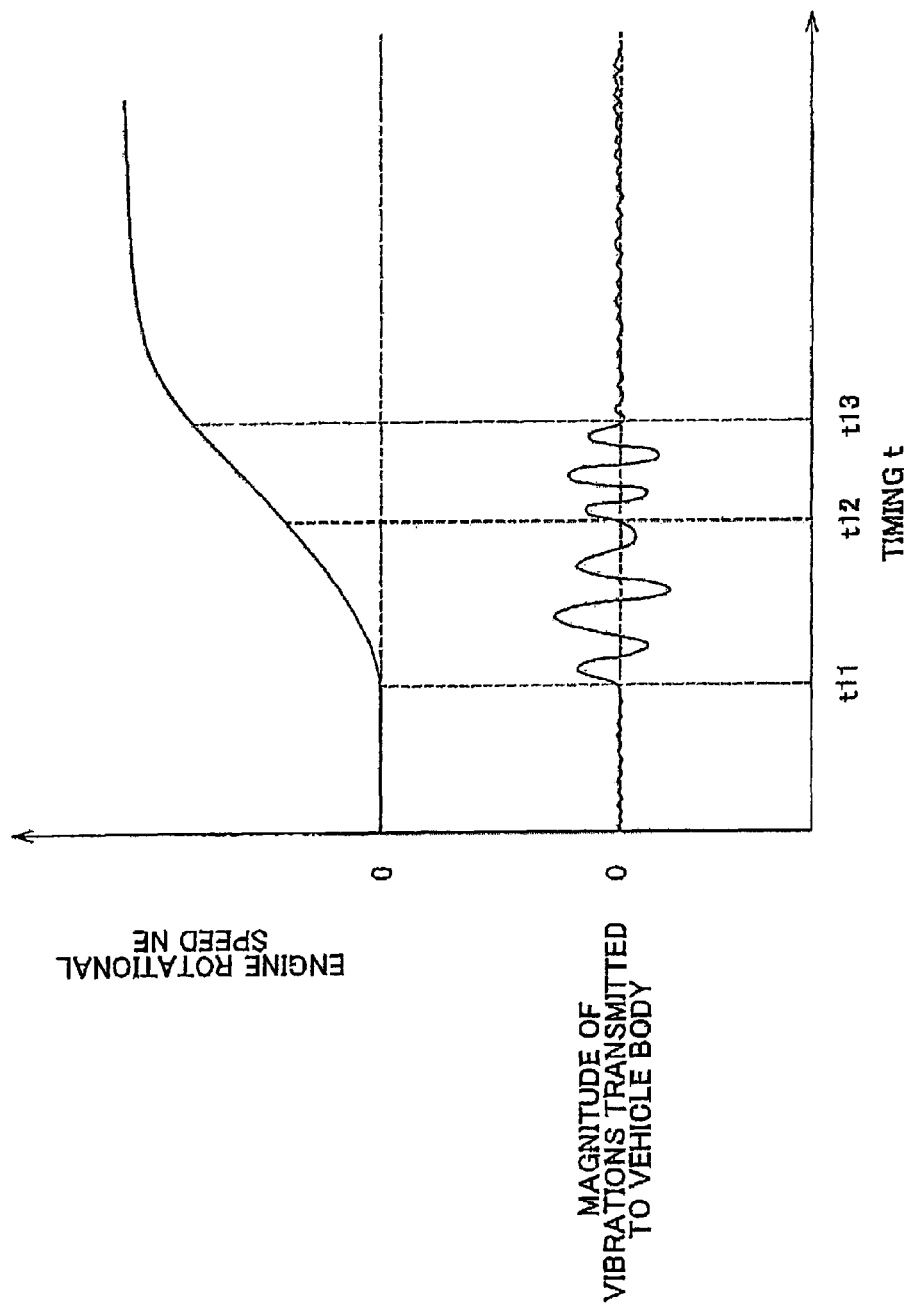
FIG. 7 is a timing chart that shows a change in engine rotational speed and a change in the magnitude of vibrations transmitted to the vehicle body when the first-cycle fuel injection amount is set so as to be larger than the second-cycle fuel injection amount at the time of an engine start in a state where the mount is elastically deformed by a large amount while the vehicle is driving according to the embodiment.
Figure 8:
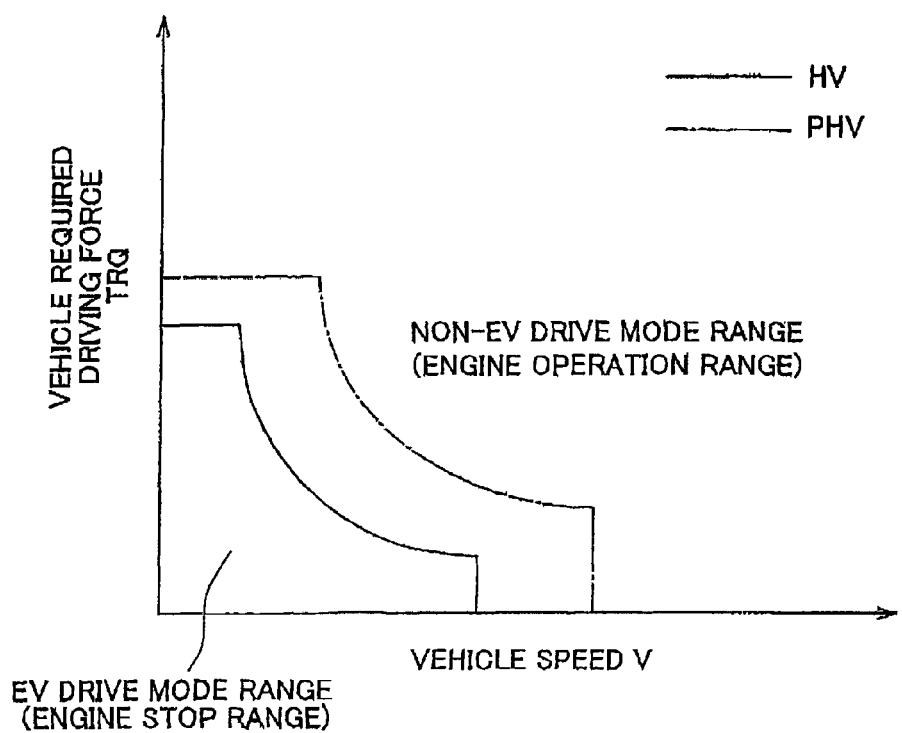
FIG. 8 is a typical map that defines an EV drive mode range and a non-EV drive mode range by a vehicle speed and a required driving force of a vehicle.

As shown in FIG. 7, vibrations due to initial combustion occur at a further early timing (timing t12 to t13) as compared with the related art shown in FIG. 4. By so doing, it is possible to reduce the time interval between vibrations due to cranking (timing t11 to t12) and vibrations due to initial combustion (timing t12 to t13) (in this case, time interval="0"). Thus, driver's uncomfortable feeling caused by an engine start while the vehicle is driving is reduced.

With the above described in-vehicle internal combustion engine control device according to the present embodiment, the following operations and advantageous effects may be obtained. Initially, the first advantageous effect will be described. In the present embodiment, at the time of an engine start while the vehicle is driving, when the required driving force TRQ of the vehicle is smaller than or equal to the predetermined value TRQth, the electronic control unit 20 estimates that the degree of deformation of the mount 11 is smaller than or equal to the predetermined degree and then sets the second-cycle fuel injection amount Q2 so as to be larger than the first-cycle fuel injection amount Q1 at the time of the engine start (Q2>Q1). On the other hand, when the required driving force TRQ of the vehicle is larger than the predetermined value TRQth, the electronic control unit 20 estimates that the degree of deformation of the mount 11 is larger than the predetermined value and then sets the first-cycle fuel injection amount Q1 so as to be larger than the second-cycle fuel, injection amount Q2 at the time of the engine start (Q1>Q2). By so doing, at the time of an engine start while the vehicle is driving, when it is estimated that the degree of deformation of the mount 11 is smaller than or equal to the predetermined degree, the second-cycle fuel injection amount Q2 is set so as to be larger than the first-cycle fuel injection amount Q1 at the time of the engine start, so an increase in engine power output due to initial combustion is gentle. In addition, at this time, because the degree of deformation of the mount 11 is small, that is, a margin for the mount 11 to elastically deform is large, so transmission of vibrations due to initial combustion to the vehicle body 2 is favorably reduced through elastic deformation of the mount 11. On the other hand, at the time of an engine start while the vehicle is driving, when it is estimated that the degree of deformation of the mount 11 is larger than the predetermined degree, the first-cycle fuel injection amount Q1 is set so as to be larger than the second-cycle fuel injection amount Q2 at the time of the engine start. As a result, when the degree of deformation of the mount 11 is large, that is, a margin for the mount 11 to elastically deform is small, and transmission of vibrations due to initial combustion to the vehicle body 2 cannot favorably be reduced through elastic deformation of the mount 11, vibrations due to initial combustion are caused to occur at a further early timing to thereby make it possible to reduce the time interval between vibrations due to cranking and vibrations due to initial combustion. Thus, driver's uncomfortable feeling caused by an engine start while the vehicle is driving may be reduced.

Next, the second advantageous effect will be described. In the present embodiment, the required driving force TRQ of the vehicle is detected as the parameter associated with the degree of deformation of the mount 11. While the vehicle is driving, as the required driving force TRQ of the vehicle increases, the acceleration of the internal combustion engine 3 mounted on the vehicle increases, and force that acts on the internal combustion engine 3 increases. Then, with an increase in force that acts on the internal combustion engine 3, the degree of deformation of the mount 11 increases. Thus, as in the case of the present embodiment, when the required driving force TRQ of the vehicle is employed as the parameter associated with the degree of deformation of the mount 11, it is possible to appropriately acquire the degree of deformation of the mount 11 through the required driving force TRQ of the vehicle.

Next, the third advantageous effect will be described. In the present embodiment, when the coolant temperature THW is lower than the predetermined temperature THWth, the fuel injection amount is set in accordance with the estimated degree of deformation of the mount 11. The startability of the engine deteriorates when the coolant temperature THW is low, so the fuel injection amount is increased in order to suppress deterioration of the startability. Therefore, when the coolant temperature THW is low, variations in engine power output due to initial combustion increase because of an increase in fuel injection amount, so vibrations due to initial combustion increase. Therefore, specifically, when the degree of deformation of the mount 11 is large at the time of a cold start while the vehicle is driving, the above described problem is remarkable, that is, transmission of vibrations due to initial combustion to the vehicle body cannot favorably be reduced through elastic deformation of the mount 11. In terms of this point, according to the present embodiment, when the coolant temperature THW is lower than the predetermined temperature THWth, the fuel injection amount is set on the basis of the estimated degree of deformation of the mount 11 to thereby make it possible to appropriately evaluate the state where transmission of vibrations due to initial combustion to the vehicle body cannot favorably be reduced through elastic deformation of the mount 11, so it is possible to appropriately reduce driver's uncomfortable feeling caused by an engine start while the vehicle is driving.

Note that the in-vehicle internal combustion engine control device is not limited to the configuration illustrated in the above embodiment, the configuration may be appropriately modified into, for example, the following alternative embodiments.

In the above embodiment, only when the coolant temperature THW is lower than the predetermined temperature THWth, the first-cycle increasing mode is selected. However, the aspect of the invention is not limited to this configuration. Irrespective of the coolant temperature THW, that is, the engine temperature, the first-cycle increasing mode may be selected when the required driving force TRQ of the vehicle is larger than a predetermined value.

In addition, in the above embodiment, the degree of deformation of the mount 11 is estimated on the basis of the required driving force TRQ of the vehicle. Instead of the required driving force TRQ of the vehicle, another corresponding vehicle state, such as the acceleration of the vehicle, the actual driving force of the vehicle and the accelerator operation amount ACCP, may be employed.

In addition, in the above embodiment, the degree of deformation of the mount 11 is estimated on the basis of the vehicle driving state; instead, for example, when detecting means that directly detects the degree of deformation of the mount 11 is provided, the first-cycle increasing mode or the second-cycle increasing mode is selected on the basis of the degree of deformation detected by the detecting means.

In addition, in the above embodiment, the ratio between the first-cycle fuel injection amount Q1 and the second-cycle fuel injection amount Q2 in the sum total Qtotal (=first-cycle fuel injection amount Q1+second-cycle fuel injection amount Q2) of the fuel injection amount set on the basis of the coolant temperature THW is variable on the basis of the degree of deformation of the mount; however, the aspect of the invention is not limited to this configuration. Instead, for example, the sum total Qtotal of the first-cycle fuel injection amount Q1 and the second-cycle fuel injection amount Q2 may be variable on the basis of the degree of deformation of the mount. That is, it is applicable that, when it is estimated that the degree of deformation of the mount is smaller than or equal to the predetermined degree, the second-cycle fuel injection amount Q2 is set so as to be larger than the first-cycle fuel injection amount Q1 at the time of the engine start; whereas, when it is estimated that the degree of deformation of the mount is larger than the predetermined degree, the first-cycle fuel injection amount Q1 is set so as to be larger than the second-cycle fuel injection amount Q2 at the time of the engine start.

In addition, in the above embodiment, the degree of deformation of the mount is divided into two ranges, that is, the range that is smaller than or equal to the predetermined degree and the range that is larger than the predetermined degree, and which is larger, between the second-cycle fuel injection amount Q2 and the first-cycle fuel injection amount Q1 at the time of the engine start is set on the basis of the range within which the degree of deformation of the mount falls. However, the aspect of the invention is not limited to this configuration; instead, for example, it is applicable that the degree of deformation of the mount is divided into three or more ranges and then the first-cycle fuel injection amount is variably set with respect to the second-cycle fuel injection amount at the time of the engine start on the basis of the range within which the degree of deformation of the mount falls. In short, it is only necessary that, at the time of an engine start while the vehicle is driving, the first-cycle fuel injection amount is set so as to be larger than the second-cycle fuel injection amount at the time of the engine start when it is estimated that the degree of deformation of the mount is large as compared with when it is estimated that the degree of deformation of the mount is small.

The invention claimed is:

1. An in-vehicle internal combustion engine control device that is applied to a vehicle equipped with an internal combustion engine and a power source, other than the internal combustion engine, as power sources that rotate a drive wheel, and that starts the engine while the vehicle is driving, comprising:
   an electronic control unit programmed to perform:
   detecting a parameter associated with a degree of deformation of a mount, wherein the mount couples the internal combustion engine to a body of the vehicle and reduces transmission of vibrations of the engine to the body of the vehicle through elastic deformation of the mount; and
   setting, at the time of an engine start while the vehicle is driving, when it is estimated from the parameter detected by the detecting unit that the degree of deformation of the mount is larger than a predetermined degree, a first-cycle fuel injection amount to be larger than a second-cycle fuel injection amount as compared with when it is estimated that the degree of deformation of the mount is smaller than or equal to the predetermined degree.

2. The in-vehicle internal combustion engine control device according to claim 1, wherein the electronic control unit detects a driving state of the vehicle as the parameter.

3. The in-vehicle internal combustion engine control device according to claim 2, wherein
the electronic control unit detects a required driving force of the vehicle as the parameter, and
when the required driving force of the vehicle is smaller than or equal to a predetermined value, it is estimated that the degree of deformation of the mount is smaller than or equal to the predetermined degree, and the electronic control unit sets the second-cycle fuel injection amount so as to be larger than the first-cycle fuel injection amount; whereas, when the required driving force of the vehicle is larger than the predetermined value, it is estimated that the degree of deformation of the mount is larger than the predetermined degree, and the electronic control unit sets the first-cycle fuel injection amount so as to be larger than the second-cycle fuel injection amount.

4. The in-vehicle internal combustion engine control device according to claim 1, wherein, when a temperature of the engine is lower than a predetermined temperature, the electronic control unit sets a fuel injection amount on the basis of the degree of deformation of the mount, which is estimated from the parameter.

5. The in-vehicle internal combustion engine control device according to claim 4, wherein, when the temperature of the engine is lower than the predetermined temperature, the electronic control unit increases a sum total of the first-cycle fuel injection amount and the second-cycle fuel injection amount as compared with when the temperature of the engine is higher than or equal to the predetermined temperature.

6. A control method for an internal combustion engine of a vehicle equipped with the internal combustion engine and a power source, other than the internal combustion engine, as power sources that rotate a drive wheel, the control method starting the engine while the vehicle is driving, comprising:
detecting a parameter associated with a degree of deformation of a mount that couples the internal combustion engine to a body of the vehicle and that reduces transmission of vibrations of the engine to the body of the vehicle through elastic deformation of the mount; and
at the time of an engine start while the vehicle is driving, when it is estimated from the detected parameter that the degree of deformation of the mount is larger than a predetermined degree, setting a first-cycle fuel injection amount so as to be larger than a second-cycle fuel injection amount as compared with when it is estimated that the degree of deformation of the mount is smaller than or equal to the predetermined degree.

* * * * *